United States Patent
Gutmann et al.

(10) Patent No.: US 12,215,183 B2
(45) Date of Patent: Feb. 4, 2025

(54) EXPANDED THERMOPLASTIC POLYURETHANE BEADS, PRODUCTION THEREOF AND PRODUCTION OF A MOLDED PART

(71) Applicant: BASF SE, Ludwigshafen am Rhein (DE)

(72) Inventors: Peter Gutmann, Ludwigshafen (DE); Elmar Poeselt, Lemfoerde (DE); Hye Jin Park, Lemfoerde (DE); Uwe Keppeler, Ludwigshafen (DE); Lutz-Peter Hoenemann, Lemfoerde (DE)

(73) Assignee: BASF SE, Ludwigshafen am Rhein (DE)

( * ) Notice: Subject to any disclaimer, the term of this patent is extended or adjusted under 35 U.S.C. 154(b) by 44 days.

(21) Appl. No.: 16/349,339

(22) PCT Filed: Nov. 13, 2017

(86) PCT No.: PCT/EP2017/079049
§ 371 (c)(1),
(2) Date: May 13, 2019

(87) PCT Pub. No.: WO2018/087362
PCT Pub. Date: May 17, 2018

(65) Prior Publication Data
US 2019/0345284 A1  Nov. 14, 2019

(30) Foreign Application Priority Data

Nov. 14, 2016 (EP) ..................................... 16198709

(51) Int. Cl.
*C08G 18/48* (2006.01)
*B29C 48/05* (2019.01)
(Continued)

(52) U.S. Cl.
CPC .......... *C08G 18/4854* (2013.01); *B29C 48/05* (2019.02); *B29C 48/345* (2019.02);
(Continued)

(58) Field of Classification Search
CPC ............. B29B 7/007; B29B 7/46; B29B 7/90; B29B 9/06; B29B 9/065; B29B 9/14; B29B 9/16; B29C 44/3461; B29C 44/445; B29C 48/0022; B29C 48/04; B29C 48/05; B29C 48/30; B29C 48/345; B29C 48/37; B29C 48/92; B29K 2075/00; B29L 2031/3005; B29L 2031/3094; B29L 2031/504; B29L 2031/5209; B29L 2031/7324; C08G 18/12; C08G 18/4854; C08G 18/6674; C08G 18/7657; C08G 18/8012; C08G 2110/0058; C08J 9/122; C08J 9/18; C08J 9/232; C08J 2201/03; C08J 2203/06; C08J 2300/22; C08J 2375/04; C08K 3/346; C08K 3/36; C08K 75/04; C08K 75/06; C08K 75/08; F26B 5/08; F26B 2200/08
See application file for complete search history.

(56) References Cited

U.S. PATENT DOCUMENTS

| | | | |
|---|---|---|---|
| 4,990,357 A * | 2/1991 | Karakelle | A61L 29/085 |
| | | | 427/2.12 |
| 10,279,516 B2 | 5/2019 | Däschlein et al. | |
| 2009/0069526 A1 | 3/2009 | Henze et al. | |
| 2009/0104449 A1 | 4/2009 | Farah et al. | |
| 2009/0298392 A1 | 12/2009 | Okamoto et al. | |

(Continued)

FOREIGN PATENT DOCUMENTS

| DE | 10 2006 021 734 A1 | 11/2007 |
|---|---|---|
| EP | 1 927 605 A1 | 6/2008 |

(Continued)

OTHER PUBLICATIONS

International Search Report issued on Jan. 29, 2018 in PCT/EP2017/079049 filed on Nov. 13, 2017.
International Preliminary Report on Patentability issued Feb. 22, 2019 in PCT/EP2017/079049 (submitting English translation only), 5 pages.
Korean Request for the submission of an Opinion dated Jul. 12, 2022, in Korean Application No. 10-2019-7017246, with English translation, 15 pages.

*Primary Examiner* — John M Cooney
(74) *Attorney, Agent, or Firm* — Grüneberg and Myers PLLC

(57) ABSTRACT

Disclosed herein are expanded thermoplastic polyurethane beads polymerized from an isocyanate, an isocyanate-reactive compound having a molecular weight between 500 and 10 000 g/mol and a chain extender, wherein customary adjuvants may be additionally present, and the thermoplastic polyurethane has a hard phase fraction ranging from 0.1 to 0.95 and the hard phase fraction is defined by:

Figure 1:
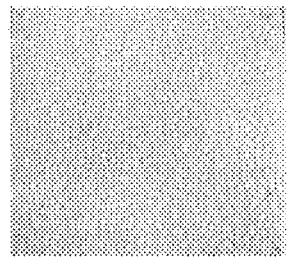

$$\text{Hard phase fraction} = \frac{\sum_{x=1}^{k}\left(\left(\frac{m_{KV_x}}{M_{KV_x}}\right) \cdot M_{Iso} + m_{KV_x}\right)}{m_{ges}}$$

where $M_{KV_x}$ represents a molar mass of chain extender x in g/mol, $m_{KV_x}$ represents a mass of chain extender x in g, $M_{Iso}$ represents a molar mass of isocyanate in g/mol, $m_{ges}$ represents a total mass of all starting materials without adjuvants, and k represents a number of chain extenders. Also disclosed herein are processes for producing expanded thermoplastic polyurethanes and processes for producing molded parts therefrom.

14 Claims, 2 Drawing Sheets

(51) Int. Cl.
- *B29C 48/345* (2019.01)
- *B29C 48/37* (2019.01)
- *B29C 48/92* (2019.01)
- *C08G 18/12* (2006.01)
- *C08G 18/66* (2006.01)
- *C08G 18/76* (2006.01)
- *C08G 18/80* (2006.01)
- *C08J 9/18* (2006.01)
- *C08K 3/36* (2006.01)
- *C08L 75/06* (2006.01)
- *C08L 75/08* (2006.01)
- *B29C 48/00* (2019.01)
- *B29C 48/04* (2019.01)

(52) U.S. Cl.
CPC .............. *B29C 48/37* (2019.02); *B29C 48/92* (2019.02); *C08G 18/12* (2013.01); *C08G 18/6674* (2013.01); *C08G 18/7657* (2013.01); *C08G 18/8012* (2013.01); *C08J 9/18* (2013.01); *C08K 3/36* (2013.01); *C08L 75/06* (2013.01); *C08L 75/08* (2013.01); *B29C 48/0022* (2019.02); *B29C 48/04* (2019.02); *C08G 2110/0058* (2021.01)

(56) References Cited

U.S. PATENT DOCUMENTS

| | | |
|---|---|---|
| 2010/0152405 A1 | 6/2010 | Sunkara |
| 2012/0083187 A1 | 4/2012 | Okamoto et al. |
| 2014/0227505 A1* | 8/2014 | Schiller ............... B29D 35/122 428/304.4 |
| 2015/0038607 A1* | 2/2015 | Baghdadi ................ C08J 9/122 521/137 |
| 2015/0174808 A1 | 6/2015 | Rudolph et al. |
| 2016/0121524 A1 | 5/2016 | Däschlein et al. |
| 2016/0297943 A1 | 10/2016 | Däschlein et al. |
| 2017/0218226 A1* | 8/2017 | Ho ..................... C08G 18/4238 |
| 2018/0237605 A1* | 8/2018 | Chang ................... C08G 18/73 |

FOREIGN PATENT DOCUMENTS

| | | |
|---|---|---|
| JP | 2008222769 | 9/2008 |
| JP | 2011/0512450 | 4/2011 |
| TW | 201509625 | 3/2015 |
| WO | WO 2007/082838 A1 | 7/2007 |
| WO | WO 2007/118827 A1 | 10/2007 |
| WO | WO 2013/153153 A1 | 10/2013 |
| WO | WO 2013/153190 A1 | 10/2013 |
| WO | WO 2015/052265 A1 | 4/2015 |
| WO | WO 2015/055811 A1 | 4/2015 |

* cited by examiner

EXPANDED THERMOPLASTIC POLYURETHANE BEADS, PRODUCTION THEREOF AND PRODUCTION OF A MOLDED PART

The present invention relates to an expanded thermoplastic polyurethane polymerized from an isocyanate, an isocyanate-reactive compound having a molecular weight between 500 and 10 000 g/mol and a chain extender wherein customary adjuvants may be additionally present. The present invention further relates to a process for producing the expanded thermoplastic polyurethane and to a process for producing a molded part from such an expanded thermoplastic polyurethane.

Expanded thermoplastic polyurethane has elastic and tribological properties and so is useful in a very wide variety of applications. Examples of uses for expanded pellets of thermoplastic polyurethanes include reusable gymnastics mats, body protectors, trim elements in automotive construction, sound and vibration absorbers, packaging and shoe soles. A high elasticity and high compressive properties are of decisive importance in all these sectors.

The component parts in question are typically produced from expanded beads by introducing the latter into a mold and then bonding them together. For this, steam is typically passed through the mold, causing the individual expanded beads to incipiently melt at the surface and bond together to form the molded part.

The chemical construction of thermoplastic polyurethanes and of expanded thermoplastic polyurethanes is essentially the same. Except that a blowing agent is admixed during the production of expanded thermoplastic polyurethanes, and causes the polyurethane to foam up as it is being produced. This subsequently also leads to different processes for further processing to produce the molded part.

Nonexpanded thermoplastic polyurethanes polymerized from an isocyanate, an isocyanate-reactive compound and a chain extender are known, for example from WO-A 2007/118827, US-A 2012/0083187, US-A 2010/0152405, DE-A 10 2006 021 734 or US-A 2009/0104449. Notably WO-A 2007/118827 reveals that the hard phase fraction is controllable by choosing the chain extender appropriately. To this end, WO-A 2007/118827 employs two different chain extenders in a mixture.

Different expanded thermoplastic polyurethanes likewise polymerized from an isocyanate, an isocyanate-reactive compound and a chain extender are described in WO-A 2007/082838, WO-A 2013/153153, WO-A 2013/153190, WO-A 2015/052265 or WO-A 2015/055811.

Irrespective of whether the thermoplastic polyurethane is produced as a compact polymer or as an expanded polymer, 1,4-butanediol is typically the chain extender used. However, 1,4-butanediol as a chain extender has the disadvantage, with expanded thermoplastic polyurethanes in particular, that a higher hard phase fraction, which leads to a higher storage modulus at room temperature (measured in accordance with DIN EN ISO 6721-2:2011 in torsion mode, at a frequency of 1 Hz and at a 20 K/min heating rate from –80° C. to 200° C., on a 2 mm thick injection molded plate conditioned at 100° C. for 20 h) and hence to a higher strength for the material, the melting temperature likewise rises. Yet this is undesirable, particularly for the further processing into molded parts from beads of the thermoplastic polyurethane, since the surface of the individual beads must be incipiently melted to bond them together into molded parts.

It is an object of the present invention to provide expanded thermoplastic polyurethane beads having a higher hard phase fraction and hence a greater storage modulus at room temperature (measured in accordance with DIN EN ISO 6721-2:2011, at a frequency of 1 Hz and at a 20 K/min heating rate from –80° C. to 200° C., on a 2 mm thick injection molded plate conditioned at 100° C. for 20 h) without the melting temperature of the thermoplastic polyurethane rising significantly versus the known thermoplastic polyurethanes in order to permit further processing.

We have found that this object is achieved by an expanded thermoplastic polyurethane bead polymerized from an isocyanate, an isocyanate-reactive compound having a molecular weight between 500 and 10 000 g/mol and a chain extender, wherein customary adjuvants may be additionally present, the thermoplastic polyurethane has a hard phase fraction in the range from 0.1 to 0.95 and the hard phase fraction is defined by $$\text{Hard phase fraction} = \frac{\sum_{x=1}^{k}\left(\left(\frac{m_{KV_x}}{M_{KV_x}}\right) \cdot M_{Iso} + m_{KV_x}\right)}{m_{ges}}$$

where
$M_{KV_x}$: molar mass of chain extender x in g/mol,
$m_{KV_x}$: mass of chain extender x in g,
$M_{Iso}$: molar mass of isocyanate in g/mol
$m_{ges}$: total mass of all starting materials without adjuvants
k: number of chain extenders, and the chain extender is a diol having 5 to 10 carbon atoms, a mixture of two or more diols wherein one or more than one diol has 4 to 10 carbon atoms and all further diols have 2 to 10 carbon atoms, a mixture of one or more than one diol having 4 to 10 carbon atoms and one or more than one diamine or a mixture of one or more than one diol having 4 to 10 carbon atoms and an aminoalcohol.

It surprisingly transpires that on using a diol having 5 to 10 carbon atoms as chain extender or a mixture of two or more diols wherein one or more than one diol has 4 to 10 carbon atoms and all further diols have 2 to 10 carbon atoms, a mixture of one or more than one diol having 4 to 10 carbon atoms and one or more than one diamine or a mixture of one or more than one diol having 4 to 10 carbon atoms and an aminoalcohol, the properties up to a temperature of 40° C. do not display any significant changes as compared with the use of 1,4-butanediol, but that the melting point and hence the processing temperature of the expanded thermoplastic polyurethane decreases and thus also permits further processing of expanded beads of the thermoplastic polyurethane having a higher hard phase fraction and hence a higher storage modulus at room temperature (measured in accordance with DIN EN ISO 6721-2:2011 in torsion mode, at a frequency of 1 Hz and at a 20 K/min heating rate from –80° C. to 200° C., on a 2 mm thick injection molded plate conditioned at 100° C. for 20 h).

Diol in the context of the present invention is to be understood as referring to branched or unbranched aliphatic, araliphatic, cycloaliphatic or aromatic hydrocarbons having two hydroxyl groups. The compounds may additionally comprise further functional groups other than hydroxyl and/or heteroatoms. However, diols without further functional groups and without heteroatoms are preferable.

The expanded thermoplastic polyurethane may be any thermoplastic polyurethane known to a person skilled in the art. Thermoplastic polyurethanes and processes for producing same have already been extensively described, for example in Gerhard W. Becker and Dietrich Braun, Kunststoffhandbuch, volume 7, "Polyurethane", Carl Hanser Verlag, Munich, Vienna, 1993.

The molecular weight reported hereinafter for the polyol is the number average molecular weight.

The thermoplastic polyurethane is obtained according to the present invention by reacting a mixture of isocyanates with isocyanate-reactive compounds having a molecular weight between 500 and 10 000 g/mol and also chain extenders. It is additionally possible to add customary adjuvants, for example chain terminators, catalysts, fillers, auxiliaries or other additives.

The preparation of the expanded thermoplastic polyurethane of the present invention requires in any event a mixture of isocyanate, isocyanate-reactive compound and chain extender. The further addition of other adjuvants is optional and may be effected individually or in all possible variations.

Organic isocyanates suitable for preparing the thermoplastic polyurethane include, for example, aliphatic, cycloaliphatic, araliphatic and/or aromatic isocyanates. Particular preference is given to aromatic, aliphatic and/or cycloaliphatic diisocyanates. Examples of suitable diisocyanates are trimethylene diisocyanate, tetramethylene diisocyanate, pentamethylene diisocyanate, hexamethylene diisocyanate, heptamethylene diisocyanate, octamethylene diisocyanate; 2-methylpentamethylene 1,5-diisocyanate, 2-ethylbutylene 1,4-diisocyanate, butylene 1,4-diisocyanate, 1-isocyanato-3,3,5-trimethyl-5-isocyanatomethylcyclohexane; 1,4-bis(isocyanatomethyl)cyclohexane; 1,4-cyclohexane diisocyanate; 1-methyl-2,4-cyclohexane diisocyanate; 1-methyl-2,6-cyclohexane diisocyanate; 2,2'-dicyclohexylmethane diisocyanate; 2,4'-dicyclohexylmethane diisocyanate; 4,4'-dicyclohexylmethane diisocyanate; 2,2'-diphenylmethane diisocyanate; 2,4'-diphenylmethane diisocyanate; 4,4'-diphenylmethane diisocyanate; 1,5-naphthylene diisocyanate; 2,4-tolylene diisocyanate; 2,6-tolylene diisocyanate; diphenylmethane diisocyanate; 3,3'-dimethylbiphenyl diisocyanate; 1,2-diphenylethane diisocyanate and phenylene diisocyanate and also any desired mixture thereof.

The isocyanate-reactive compound used for preparing the thermoplastic polyurethane is preferably selected from polyetherols, polyesterols, polybutadienols and polycarbonateols and their mixtures and also block copolymers thereof. Polyetherols, polyesterols, polybutadienols and polycarbonateols are typically also subsumed under the term "polyols".

It is a polyetherol which is preferably used for preparing the thermoplastic polyurethane. Particularly preferred isocyanate-reactive compounds are polytetrahydrofurandiol, polytrimethylene oxide diol and polypropylene oxide diol. Polyesterols and polycarbonateols are also possible for preparing the thermoplastic polyurethane as well as polyetherols. Polycaprolactonediols are particularly preferable for use as polyesterols.

In addition to polyols based on fossil starting materials, it is also possible to use polyols manufactured from starting materials produced from renewable raw materials.

The polyols used for preparing the thermoplastic polyurethane preferably have a molecular weight in the range from 500 to 8000 g/mol, more preferably from 600 to 6000 g/mol and especially from 800 to 4000 g/mol. It is further preferable for the polyols to have an average functionality of 1.3 to 2.3, more preferably of 1.9 to 2.2 and especially of 2. Polyetherdiols, polyesterdiols, polybutadienediols and polycarbonatediols are therefore preferable. When the polyol is a polyether alcohol, especially polytetrahydrofurandiol, polytrimethylene oxide diol or polypropylene oxide diol, the molecular weight is preferably between 600 and 2500 g/mol.

According to the present invention, chain extenders are used for preparing the expanded thermoplastic polyurethane subject to the proviso that the amount of chain extender is chosen such that the thermoplastic polyurethane obtained has a hard phase fraction in the range of 0.1 to 0.95 and is defined by $$\text{Hard phase fraction} = \frac{\sum_{x=1}^{k}\left(\left(\frac{m_{KV_x}}{M_{KV_x}}\right)\cdot M_{Iso} + m_{KV_x}\right)}{m_{ges}}$$

where
$M_{KV_x}$: molar mass of chain extender x in g/mol,
$M_{KV_x}$: mass of chain extender x in g,
$M_{Iso}$: molar mass of isocyanate in g/mol
$m_{ges}$: total mass of all starting materials without adjuvants
k: number of chain extenders.

The chain extenders used are preferably aliphatic, araliphatic, aromatic and/or cycloaliphatic compounds, which preferably have a molecular weight of 50 to 500 g/mol. The chain extenders may be used individually or in the mixture. When only one chain extender is used, the present invention provides that it be a diol having 5 to 10 carbon atoms and preferably selected from the group consisting of 1,5-pentanediol, 1,6-hexanediol, 1,7-heptanediol, 1,8-octanediol, 1,9-nonanediol, 1,10-decanediol, 1,4-cyclohexyldimethanol, 2-butyl-2-ethylpropanediol, neopentyl glycol, 2,2,4-trimethyl-1,3-pentanediol, pinacol, 2-ethyl-1,3-hexanediol, 1,4-cyclohexanediol and N-phenyldiethanolamine.

When a mixture of two or more different chain extenders is used, one or more of the chain extenders used is a diol having 4 to 10 carbon atoms. Any further chain extenders used may be selected from diols having 2 to 10 carbon atoms, diamines or aminoalcohols. When the chain extender is a mixture of two or more diols, the diol having 4 to 10 carbon atoms preferably comprises from 50 to 99.9 wt % based on total chain extender mass.

The first diol, i.e., the diol having 4 to 10 carbon atoms, is preferably selected from 1,4-butanediol and 1,6-hexanediol.

In a mixture of two or more diols, all further diols are preferably selected from 1,2-ethylene glycol, 1,2-propylene glycol, 1,3-propanediol, 1,4-butanediol, 1,5-pentanediol, 1,6-hexanediol, 1,7-heptanediol, 1,8-octanediol, 1,9-nonanediol, 1,10-decanediol, 1,4-cyclohexyldimethanol, 2-butyl-2-ethylpropanediol, neopentyl glycol, 2,2,4-trimethyl-1,3-pentanediol, pinacol, 2-ethyl-1,3-hexanediol, 1,4-cyclohexanediol and N-phenyldiethanolamine.

When the mixture of two or more chain extenders comprises a diamine, the diamine is preferably a diamine having not more than 17 carbon atoms, more preferably selected from ethylenediamine, isophoronediamine, methylenediphenyldiamine, 1,4-diaminobutane, trans-1,4-diaminocyclohexane, bis(4-amino-2-chloro-3,5-diethylphenyl)methane, 4,4'-methylenebis(2,6-diethylaniline), 4,4'-methylenebis(2-isopropyl-6-methylaniline), 4,4'-methylenebis(2,6-diisopropylaniline) and 1,6-diaminohexane.

An aminoalcohol in the mixture is preferably selected from ethanolamine, 4-amino-1-butanol and 6-amino-1-hexanol.

However, it is particularly preferable for the chain extender to be a diol or a mixture of two or more diols. It is very particularly preferable for the chain extender to be 1,6-hexanediol.

A mixture of two or more chain extenders may utilize chain extenders having diol-functional groups as well as the aforementioned chain extenders. It is also possible to use chain extenders having carboxyl-functional groups which, on reaction with an isocyanate group, form amides by elimination of $CO_2$. These types of chain extenders having carboxyl-functional groups may only be admixed in small amounts, i.e., amounts of less than 40 wt % based on total chain extender mass.

It surprisingly transpires that the use of the corresponding chain extenders provides huge scope for varying the hard phase fraction in the expanded thermoplastic polyurethane while at the same time providing a processing and melting temperature below 160° C., especially below 120° C., making it possible in particular to process a bead foam into a molded part, i.e., to fuse together individual expanded beads.

The proportion of chain extenders is preferably adjusted such that the hard phase fraction is in the range from 0.15 to 0.5 and especially in the range from 0.2 to 0.45. By virtue of such a hard phase fraction, the thermoplastic polyurethane obtained has a sufficiently high storage modulus at room temperature (measured in accordance with DIN EN ISO 6721-2:2011 in torsion mode, at a frequency of 1 Hz and at a 20 K/min heating rate from −80° C. to 200° C., on a 2 mm thick injection molded plate conditioned at 100° C. for 20 h) preferably in the range from 5 to 100 MPa, and hence has sufficient strength, the latter depending on the use intended for the expanded thermoplastic polyurethane.

The density of the expanded thermoplastic polyurethane beads (determined to DIN EN ISO 527:2012) is in the range from 10 to 500 g/l, preferably in the range from 50 to 350 g/l.

Adjuvants customary for the production of thermoplastic polyurethanes may yet additionally also be present besides the isocyanate, the isocyanate-reactive compound and the chain extender. Customary adjuvants include, for example, chain terminators, catalysts, fillers, auxiliaries or further adjuvants. The addition of adjuvants to the thermoplastic polyurethane is optional and may be effected individually or in all possible variations.

Any chain terminators used typically have a molecular weight of 30 to 500 g/mol. Chain terminators are compounds having merely one isocyanate functional group. Examples of chain terminators are monofunctional alcohols, monofunctional amines, preferably methylamine, and/or monofunctional polyols. A chain terminator is useful to precisely control the flowability of the mixtures obtained from the individual components. Chain terminators are applied in preferred embodiments at from 0 part by weight to 5 parts by weight, more preferably from 0.1 part by weight to 1 part by weight, based on 100 parts by weight of the compound having two or more isocyanate-reactive hydrogen-containing groups. Chain terminators are in effect employed to complement the chain extenders.

To speed the reaction between the isocyanate groups of the diisocyanates and the isocyanate-reactive compounds, more particularly hydroxyl groups, of the chain terminators and of the chain extenders, a catalyst may be used. The catalyst is preferably selected from the group of tertiary amines, for example triethylamine, dimethylcyclohexylamine, N-methylmorpholine, N,N-dimethylpiperazine, 2-(dimethylaminoethoxy)ethanol, diazabicyclo(2,2,2)octane and similar substances. The at least one catalyst is further preferably selected from the group of organometallic compounds and is for example: a titanate ester, an iron compound, for example iron(III) acetylacetonate, a tin compound, for example tin diacetate, tin dioctoate, tin dilaurate or a tin dialkyl salt of an aliphatic carboxylic acid such as dibutyltin diacetate, dibutyltin dilaurate or the like.

Catalysts are usable singly or in mixtures of catalysts. The catalyst used is preferably a mixture of catalysts in amounts from 0.001 wt % to 0.1 wt %, based on the compound having two or more isocyanate-reactive hydrogen-containing groups, preferably based on the polyhydroxy compound.

Useful auxiliaries and/or further additives include, for example, hydrolysis control agents and/or antioxidants. Further additives and auxiliaries are found in standard works such as, for example, in the already aforementioned Gerhard. W. Becker and Dietrich Braun, Kunststoffhandbuch, volume 7 "Polyurethane", Carl Hanser Verlag, Munich, Vienna, 1993.

Besides catalysts, but also without the use of catalysts, hydrolysis control agents, for example polymers and low molecular weight carbodiimides, may also be added to the isocyanates and the compound having two or more isocyanate-reactive hydrogen-containing groups for preparing the thermoplastic polyurethane.

The thermoplastic polyurethane may further comprise a phosphorus compound. Phosphorus compounds used are preferably organophosphorus compounds of trivalent phosphorus, for example phosphites and phosphonites. Examples of suitable phosphorus compounds are triphenyl phosphites, diphenyl alkyl phosphite, phenyl dialkyl phosphite, tris (nonylphenyl) phosphite, trilauryl phosphite, trioctadecyl phosphite, distearylpentaerythritol diphosphite, tris(2,4-di-tert-butylphenyl) phosphite, diisopentaerythritol diphosphite, di(2,4-di-tert-butylphenyl)pentaerythritol diphosphite, tristearylsorbitol triphosphite, tetrakis(2,4-di-tert-butylphenyl)-4,4'-diphenylene diphosphonite, triisodecyl phosphite, diisodecyl phenyl phosphite and diphenyl isodecyl phosphite or mixtures thereof.

Particular preference is given to embodiments comprising phosphorus compounds that are difficult to hydrolyze, since the hydrolysis of a phosphorus compound to the corresponding acid can lead to damage being inflicted on the polyurethane, particularly the polyester urethane. Accordingly, phosphorus compounds that are particularly difficult to hydrolyze are suitable for polyester urethanes in particular. Preferred embodiments of difficult-to-hydrolyze phosphorus compounds include, for example, dipolypropylene glycol phenyl phosphite, phenyl diisodecyl phosphite, diphenyl monodecyl phosphite, triisononyl phosphite, tris(2,4-di-tert-butylphenyl) phosphite, tetrakis(2,4-di-tert-butylphenyl)-4, 4'-diphenylene disphosphonite and di(2,4-di-tert-butylphenyl)pentaerythritol diphosphite or mixtures thereof.

To set the hard phase fraction and hence not only the storage modulus at room temperature (measured in accordance with DIN EN ISO 6721-2:2011 in torsion mode, at a frequency of 1 Hz and at a 20 K/min heating rate from −80° C. to 200° C., on a 2 mm thick injection molded plate conditioned at 100° C. for 20 h) but also the Shore hardness of the thermoplastic polyurethane, the compounds having two or more isocyanate-reactive hydrogen-containing groups and the chain extenders can be varied within relatively wide molar ratios. In preferred embodiments, the molar ratio of compounds having two or more isocyanate-reactive hydrogen-containing groups toward total chain extender used is in the range from 10:1 to 1:10, preferably in the range from 5:1 to 1:8, more preferably in the range from 1:1 to 1:4, the hardness of the thermoplastic polyurethane increasing with increasing chain extender content. Shore hardnesses ranging from A75 to D60, more preferably from A83 to A95 and especially from A85 to A90 are obtainable in this way. Shore hardnesses are determined according to DIN ISO 7619-1:2012 on the compact, i.e., non-expanded thermoplastic polyurethane. Plates are used for this, which are produced either from the starting material or from the melted expanded thermoplastic polyurethane beads or molded parts produced therefrom.

Setting the ratio between the isocyanate-reactive compound and the chain extender is a way to also set the storage modulus. The latter is preferably likewise determined on the compact, nonexpanded thermoplastic polyurethane. The storage modulus of the polyurethane without fillers at room temperature (measured in accordance with DIN EN ISO 6721-2:2011 in torsion mode, at a frequency of 1 Hz and at a 20 K/min heating rate from −80° C. to 200° C., on a 2 mm thick injection molded plate conditioned at 100° C. for 20 h) is preferably in the range from 1 to 300 MPa, more preferably in the range from 5 to 200 MPa and especially in the range from 10 to 100 MPa.

Using the diol having 5 to 10 carbon atoms or the mixture of two or more diols wherein one or more than one diol has 4 to 10 carbon atoms and all further diols have 2 to 10 carbon atoms, the mixture of one or more than one diol having 4 to 10 carbon atoms and one or more than one diamine or the mixture of one or more than one diol having 4 to 10 carbon atoms and an aminoalcohol as a chain extender provides even at high hard phase fractions, i.e., at great Shore hardnesses and high storage moduli at room temperature (measured in accordance with DIN EN ISO 6721-2:2011 in torsion mode, at a frequency of 1 Hz and at a 20 K/min heating rate from −80° C. to 200° C., on a 2 mm thick injection molded plate conditioned at 100° C. for 20 h) a processing temperature that is distinctly lower than from using the 1,2-ethylene glycol or 1,4-butanediol typically employed as chain extender. More particularly, the expanded polyurethane prepared from the thermoplastic polyurethane is still processable at temperatures below 160° C.

The reaction to form the thermoplastic polyurethane is preferably carried out at customary indices. The index is defined as the ratio of the total number of isocyanate groups of the aromatic, aliphatic and/or cycloaliphatic diisocyanate which are used in the reaction to the isocyanate-reactive groups, i.e., the active hydrogens of the compound having two or more isocyanate-reactive hydrogen-containing groups and chain extenders. An index of 100 means that there is one active hydrogen atom, i.e., one isocyanate-reactive function of the compound having two or more isocyanate-reactive hydrogen-containing groups and of the chain extenders per isocyanate group of the aromatic, aliphatic and/or cycloaliphatic diisocyanate. Indices above 100 mean that there are more isocyanate groups than there are isocyanate-reactive groups, for example hydroxyl groups.

In particularly preferred embodiments, the reaction to form the thermoplastic polyurethane takes place at an index between 60 and 120 and more preferably at an index between 80 and 110.

Auxiliaries and further additives used in addition to the catalysts and chain terminators include, for example, surface-active substances, flame retardants, oxidation stabilizers, slip and demolding assistants, dyes and pigments, optionally additional further stabilizers, for example against hydrolysis, light, heat or discoloration, reinforcing agents and plasticizers. Any fillers used may be organic and/or inorganic.

When the thermoplastic polyurethane comprises fillers, these are for example organic and inorganic powders or fibrous materials and also mixtures thereof. Useful organic fillers include for example wood flour, starch, flax fibers, hemp fibers, ramie fibers, jute fibers, sisal fibers, cotton fibers, cellulose fibers or aramid fibers. Useful inorganic fillers include for example silicates, barite, glass balls, zeolites, metals or metal oxides. Particular preference is given to using pulverulent inorganics such as chalk, kaolin, aluminum hydroxide, magnesium hydroxide, aluminum nitrite, aluminum silicate, barium sulfate, calcium carbonate, calcium sulfate, silica, powdered quartz, Aerosil, argillaceous earth, mica or wollastonite or spherical or fibrous inorganics, for example iron powder, glass balls, glass fibers or carbon fibers. The average particle diameter or, in the case of fibrous fillers, the length of the fibers should be in the region of the cell size or less. Preference is given to an average particle diameter or average fiber length in the range from 0.01 to 100 μm and preferably in the range from 0.1 to 50 μm. Preference is given to expandable thermoplastic polyurethanes which comprise a blowing agent and also between 5 to 80 wt % of organic and/or inorganic fillers, based on the total weight of the thermoplastic polyurethane comprising a blowing agent.

To reduce the radiative contribution to thermal conductivity, the thermoplastic polyurethane may comprise IR opacifiers such as metal oxides, nonmetal oxides, metal powders, for example aluminum powders, carbon, for example carbon black, graphite, graphene, graphene oxides, carbon nanotubes, diamond, or organic dyes and dye pigments, which is advantageous for high-temperature applications in particular. Carbon black, titanium dioxide, iron oxides and zirconium dioxide are particularly preferable. These materials are usable each on their own but also in combination, i.e., in the form of a mixture of two or more materials.

Surface-active substances for possible inclusion in the thermoplastic polyurethane include for example compounds which are used to augment homogenization of starting materials and may also be capable of regulating the cell structure. Suitable surface-active substances include for example emulsifiers, for example sodium salts of castor oil sulfates or of fatty acids and also salts of fatty acids with amines, for example diethylamine oleate, diethanolamine stearate, diethanolamine ricinoleate, salts of sulfonic acids, for example alkali metal or ammonium salts of dodecylbenzene- or dinaphthylmethanedisulfonic acid and ricinoleic acid; foam stabilizers such as siloxane-oxyalkylene interpolymers and other organosiloxanes, ethoxylated alkylphenols, ethoxylated fatty alcohols, paraffin oils, castor oil esters or ricinoleic esters, Turkey red oil and peanut oil, and cell regulators, for example paraffins, fatty alcohols and dimethylpolysiloxane. Oligomeric polyacrylates having polyoxyalkylene and fluoroalkane moieties as side groups are further useful for improving the emulsifying effect, the cell structure and/or the stabilization thereof. The surface-active substances are typically used in amounts from 0.01 to 5 wt %, based on the total weight of the thermoplastic polyurethane.

Suitable flame retardants for possible inclusion in the thermoplastic polyurethane include for example tricresyl phosphate, tris(2-chloroethyl)phosphate, tris(2-chloropropyl)phosphate, tris(1,3-dichloropropyl)phosphate, tris(2,3-dibromopropyl)phosphate and tetrakis(2-chloroethyl)ethylene diphosphate. In addition to the halogen-substituted phosphates already mentioned, inorganic flame retardants comprising red phosphorus, aluminum oxide hydrate, antimony trioxide, arsenic trioxide, ammonium polyphosphate and calcium sulfate or cyanuric acid derivatives, for example melamine or mixtures of at least two flame retardants, for example ammonium phosphate and melamine and also optionally starch and/or expandable graphite can also be used for conferring flame retardancy on the foamed polyurethanes produced. It will generally prove advantageous to use from 0 to 50 wt % and preferably from 5 to 25 wt % of flame retardant or flame retardant mixture relative to the total weight of the thermoplastic polyurethane.

To produce the expanded thermoplastic polyurethane, it is further preferable to additionally admix one or more nucleating agents. Useful nucleating agents include in particular talc, calcium fluoride, sodium phenylphosphinate, aluminum oxide, carbons such as carbon black, carbon nanotubes graphite, graphene and graphene oxides pigments and finely divided polytetrafluoroethylene each individually or else in any mixtures. Talc is particularly preferable for use as nucleating agent. The proportion of the overall mass of the thermoplastic polyurethane or of the melt of the thermoplastic polyurethane which is attributable to the nucleating agent is preferably in the range from 0 to 4 wt % and especially in the range from 0.1 to 2 wt %.

Existing processes are employable to produce the expanded thermoplastic polyurethane. It is particularly preferable here to choose the amount of the blowing agent used to produce the expanded thermoplastic polyurethane such that the expanded thermoplastic polyurethane is above 85% closed-cell and has an average cell size in the range from 0.1 to 800 μm, preferably in the range from 1 to 500 μm, especially in the range from 5 to 250 μm and most preferably in the range from 50 to 150 μm. The proportion of closed cells and the cell size are quantifiable visually from micrographs for example.

The blowing agent used to produce the expanded thermoplastic polyurethane beads may be any customary blowing agent known to a person skilled in the art. The blowing agent used depends on the production process of the expanded thermoplastic polyurethane beads and is more particularly described hereinafter in conjunction with the production processes of the expanded thermoplastic polyurethane beads.

The expanded thermoplastic polyurethane beads are preferably obtained using a process comprising the steps of:
(a) reacting an isocyanate with an isocyanate-reactive compound and a chain extender optionally in the presence of one or more catalysts and/or adjuvants to form a polyurethane, wherein the amounts of isocyanate, of isocyanate-reactive compound and of chain extender are adjusted such that the thermoplastic polyurethane has a hard phase fraction in the range from 0.1 to 0.95 and the hard phase fraction is defined by $$\text{Hard phase fraction} = \frac{\sum_{x=1}^{k}\left(\left(\frac{m_{KVx}}{M_{KVx}}\right) \cdot M_{Iso} + m_{KVx}\right)}{m_{ges}}$$

where
$M_{KVx}$: molar mass of chain extender x in g/mol,
$m_{KVx}$: mass of chain extender x in g,
$M_{Ixo}$: molar mass of isocyanate in g/mol
$m_{ges}$: total mass of all starting materials without adjuvants
k: number of chain extenders, and the chain extender is a diol having 5 to 10 carbon atoms, a mixture of two or more diols wherein one or more than one diol has 4 to 10 carbon atoms and all further diols have 2 to 10 carbon atoms, a mixture of one or more than one diol having 4 to 10 carbon atoms and one or more than one diamine or a mixture of one or more than one diol having 4 to 10 carbon atoms and an aminoalcohol,
(b) impregnating the polyurethane with a blowing agent,
(c) depressurizing the blowing agent-impregnated polyurethane into the expanded thermoplastic polyurethane.

The reaction in step (a) of the isocyanate with the isocyanate-reactive compound and the chain extender may be carried out via conventional processes continuously, for example with reaction extruders or the belt process according to the one-shot process or the prepolymer process, or batchwise according to the known prepolymer process. In these processes, the reactant components may be mixed with each other in succession or simultaneously, and the reaction ensues immediately.

When the preparation is carried out in a reaction extruder, the isocyanate, the isocyanate-reactive compound and the chain extender and also optionally the catalyst and/or the adjuvants are introduced singly or as a mixture into the extruder and reacted at, for example, temperatures in the range from 100 to 280° C., preferably in the range from 140 to 250° C. The thermoplastic polyurethane obtained is extruded, cooled down and pelletized. It may possibly be advantageous to condition the resultant thermoplastic polyurethane at 80 to 120° C., preferably at 100 to 110° C. for a period of from 1 to 24 hours before further processing.

The thermoplastic polyurethane obtained is used in the present invention to produce the expanded polyurethane beads. The beads preferably have a maximum longitudinal dimension in the range from 1 to 25 mm, especially a maximum longitudinal dimension of 2 to 15 mm.

After the thermoplastic polyurethane has been produced, it is impregnated with a blowing agent and finally depressurized into expanded thermoplastic polyurethane beads.

In one possible embodiment, for example, the polyurethane is impregnated with the blowing agent in an extruder, the impregnated polyurethane is cut into a pellet material and the pellet material is depressurized into expanded thermoplastic polyurethane beads after cutting. To impregnate the polyurethane with the blowing agent in the extruder, a blowing agent is fed into the extruder as the thermoplastic polyurethane in the extruder is melting. The blowing agent-containing mixture is then, in one scenario, extruded and pelletized under such pressure and temperature conditions that the pellet material of the thermoplastic polyurethane does not foam (expand), for example by using an underwater pelletization operated at a water pressure of more than 2 bar and a water temperature of from 10° C. to 40° C. This scenario gives blowing agent-containing, expandable beads which, by subsequent heating, are foamed into the expanded beads. Alternatively and preferably, however, it is also possible to adjust the pressure and temperature conditions in the underwater pelletization so as to favor an expansion. In this scenario, the melt strand emerging from the extruder foams up and is pelletized to obtain the expanded beads. The pressure and the temperature for this are dependent on the polyurethane employed and the blowing agent quantity. Typically, the pressure is in the range from 1 to 20 bar, preferably in the range from 2 to 15 bar, and the temperature is between 20° C. and 60° C., preferably between 20° C. and 40° C. The pressure to be established and the temperature are dependent on the polyurethane to be processed.

The production of the thermoplastic polyurethane and the mixture of the blowing agent to produce the expanded thermoplastic polyurethane may be carried out in two different extruders. Alternatively, however, it is also possible to use just one extruder. In this case, the front part of the extruder, into which the isocyanate, the isocyanate-reactive compound, the chain extender and the optionally further adjuvants are admixed, serves as reactive extruder and the blowing agent is admixed at a later stage in the extruder, where the reaction to form the polyurethane has concluded.

In an alternative embodiment, the polyurethane obtained in step (a) is cut into a pellet material. This is impregnated in an aqueous suspension with 0.1 to 40 wt % of a blowing agent at a temperature in the range from 100 to 160° C. and a pressure in the range from 5 to 100 bar, the suspension is subsequently cooled down to 20-95° C. and then the blowing agent-containing pellet material thus obtained is depressurized. For this it is possible, in one scenario, to initially cool down the aqueous suspension comprising the pellet material, causing the beads to solidify with the included blowing agent, and then to depressurize the reactor. The blowing agent-containing beads thus obtained are subsequently foamed into the expanded beads by heating. Alternatively, the hot aqueous suspension comprising the pellet material is—without cooling—depressurized abruptly (in an explosive expansion process), causing the softened beads comprising the blowing agent to foam up directly into the expanded beads. The production of the expanded thermoplastic polyurethane may be effected in principle as described in WO-A 2007/082838.

The blowing agent used to produce the expanded thermoplastic polyurethane beads may vary according to the production process. When the blowing agent is to be admixed in an extruder or an impregnating tank, the blowing agent used is preferably a volatile organic compound having a boiling point in the range from −25 to 160° C., especially −10 to 125° C., at 1013 mbar standard pressure. Highly suitable are optionally halogenated hydrocarbons, although halogen-free hydrocarbons are preferred. Particular preference is given to the $C_4$-$C_{10}$ alkanes, for example the isomers of butane, of pentane, of cyclopentane, of hexane, of heptane and of octane, more preferably s-pentane. Suitable blowing agents further include sterically bulkier compounds, such as alcohols, ketones, esters, ethers and organic carbonates. Organic blowing agents are also combinable. Suitable inorganic gases are nitrogen, air, ammonia or carbon dioxide or combinations thereof and/or with the further blowing agents mentioned above. These recited inorganic gases are likewise usable for the impregnation in an autoclave.

Hydrohalocarbons are also usable, but preferably the blowing agent is halogen-free. However, minor proportions of halogenated blowing agents in the blowing agent mixture shall not be foreclosed. The blowing agents are usable not only pure but also in any desired mixture.

The recited blowing agents aside, nitrogen and/or carbon dioxide, especially supercritical carbon dioxide, are usable to produce the expanded thermoplastic pellet material not only by extrusion but also in aqueous suspension.

The blowing agent quantity is preferably in the range from 0.1 to 40 parts by weight, especially from 0.5 to 35 and more preferably from 1 to 30 parts by weight based on 100 parts by weight of thermoplastic polyurethane used.

The expanded thermoplastic polyurethane beads are used in particular to produce molded parts from bead foams. To produce a molded part from such expanded thermoplastic polyurethane beads, a suitable process comprises the steps of:

(a) introducing the expanded thermoplastic polyurethane beads into a mold, and
(b) subjecting the expanded thermoplastic polyurethane beads introduced into the mold to steam, hot air or high-energy radiation whereby the expanded thermoplastic polyurethane beads incipiently melt at the surface and fuse together to form the molded part.

Heating the surface of the expanded thermoplastic polyurethane beads in the manner required for fusion, so that they undergo incipient melting, is effected by application of steam, hot air or high-energy radiation each singly or in any desired combinations. Suitable high-energy radiation includes, for example, microwave radiation, radiofrequency radiation or infrared radiation. However, it is preferable to use steam or hot air, particularly steam.

When steam is used to fuse the expanded thermoplastic polyurethane beads together, the temperature of the steam introduced into the mold is adjustable via the pressure. The higher the pressure, the higher the boiling temperature of the water and hence the temperature which the steam can assume. Superheated steam or unsaturated steam is usable as well as saturated steam. Suitable pressures at which the steam is introduced into the mold range from 0.1 bar to 6 bar, preferably from 0.3 to 3 bar.

Using the expanded thermoplastic polyurethane of the present invention is a way to produce even molded parts having a high hard phase fraction, in particular a hard phase fraction greater than 0.35 and hence molded parts having a comparatively high storage modulus at room temperature (measured in accordance with DIN EN ISO 6721-2:2011 in torsion mode, at a frequency of 1 Hz and at a 20 K/min heating rate from −80° C. to 200° C., on a 2 mm thick injection molded plate conditioned at 100° C. for 20 h) and correspondingly great hardness, since the high hard phase fraction notwithstanding a processing temperature is obtained, particularly at the start of the melting range of the hard phase of the expanded thermoplastic polyurethane, that is below 160° C., preferably in the range from 100 to 140° C. The start of melting of the hard phase correlates with the sudden drop in the storage modulus at the end of the viscoelastic plateau at a temperature above 80° C. The pressure and the temperature of the steam used to produce the molded part is chosen here such that, on being subjected to the steam, the expanded thermoplastic polyurethane pellet material used merely melts incipiently at the surface and neighboring beads thus bond together. Complete melting of the thermoplastic polyurethane must be avoided when attempting to produce a molded part, or a solid slab would be obtained. To avoid complete melting of the expanded thermoplastic pellet material, the length of time to which the expanded thermoplastic polyurethane beads are subjected to steam, hot air or high-energy radiation is adjusted such that merely an incipient melting of the surface takes place. As a result, increasing the temperature of the steam or of the hot air and of the intensity of the high-energy radiation will result in a shorter period of exposure. To ensure incipient melting, the use of steam or hot air requires that the temperature of the steam and hot air, respectively is above the melting temperature of the expanded thermoplastic polyurethane. The fusion process is preferably carried out such that the particulate surface texture of the final molded part is very substantially preserved.

Molded parts obtainable in this way include, for example, shoe soles, gymnastics mats, body protectors, trim elements in automotive construction, sound absorbers, vibration absorbers, for example sprung forks, cushioning pads, bicycle saddles, toys, tires or tire parts or surfaces for athletic running tracks, sports halls or footpaths, or packaging items.

EXAMPLES

Production of Example and Reference Materials

At a 6 L/D distance from the start of the processing part of a ZSK43 twin-screw extruder from Coperion GmbH being used as a reaction extruder to mix and synthesize various thermoplastic polyurethanes, 4,4'-diphenylmethane diisocyanate, polytetramethylene glycol having a number average molar mass ($M_n$) of 1000±100 g/mol, a diol and also 1 wt % of UV— and thermal stabilizers are metered in and, at a temperature between 180 and 220° C., mixed with 30 ppm of tin(II) dioctoate as catalyst and reacted. The distance of 6 L/D is chosen in order to avoid backflowing monomer getting into the drive unit. The precise proportions of the individual components making up the particular example and reference materials are listed in Table 1.

The reaction mixture from the reaction extruder is transferred into a ZSK92 twin-screw extruder from Coperion GmbH being used as main extruder. The feed throat of the main extruder is positioned at a 6 L/D distance from the start of the processing part. In the main extruder, the reaction is progressed at temperatures in the range from 200 to 240° C.

A melt pump is used to force the polymer melt through a temperature-regulated pelletizing die at 200° C. into a water-flooded pelletizing chamber. The diameter of the holes in the pelletizing die is 1.8 mm. Rotating blades in the pelletizing chamber face-cut the polymer melt at the pelletizing die into pellets. The water carries the pellets out of the pelletizing chamber and into a centrifugal dryer. The pellets are separated from the water in the centrifugal dryer and they are subsequently dried at 70° C. for 4 h.

TABLE 1

Amounts of components metered into a reaction extruder for thermoplastic materials serving as example and reference materials

| Designation | Polytetramethylene glycol | 4,4'-Diphenylmethane diisocyanate | Diol |
| --- | --- | --- | --- |
| Ex. Mat. 1 | 57 wt % | 33.1 wt % | 8.9 wt % of 1,6-hexanediol |
| Ex. Mat. 2 | 53.8 wt % | 35 wt % | 10.2 wt % of 1,6-hexanediol |
| Ex. Mat. 3 | 49.1 wt % | 37.8 wt % | 12.1 wt % of 1,6-hexanediol |
| Ref. Mat. 1 | 59.2 wt % | 33.2 wt % | 6.6 wt % of 1,4-butanediol |
| Ref. Mat. 2 | 56.3 wt % | 35.2 wt % | 7.5 wt % of 1,4-butanediol |
| Ref. Mat. 3 | 53 wt % | 37.4 wt % | 8.6 wt % of 1,4-butanediol |
| Ref. Mat. 4 | 59.2 wt % | 33.9 wt % | 5.8 wt % of 1,3-propanediol |

This method of preparation gives thermoplastic polyurethanes having the properties listed in Table 2. Shore hardness was determined to DIN ISO 7619-1:2012 at room temperature after an impression time of 3 s on injection molded plates conditioned at 100° C. for 20 h, melt flow rate (MFR) was measured on the pellets in accordance with DIN EN ISO1133-2:2012 and the start of the melting range of the hard phase was determined from dynamic-mechanical analysis (DMA) measurements (heating rate 20 K/min, frequency 1 Hz) to DIN EN ISO 6721-2:2011 in the torsion mode.

TABLE 2

Properties of example and reference materials obtained

| Designation | Shore hardness | MFR (190° C., 21.6 kg) | Start of melting range of hard phase |
| --- | --- | --- | --- |
| Ex. Mat. 1 | 83 ± 2 A | >40 g/10 min | 110° C. |
| Ex. Mat. 2 | 85 ± 2 A | >40 g/10 min | 110° C. |
| Ex. Mat. 3 | 90 ± 2 A | >40 g/10 min | 110° C. |
| Ref. Mat. 1 | 83 ± 2 A | >40 g/10 min | 115° C. |
| Ref. Mat. 2 | 85 ± 2 A | >40 g/10 min | >120° C. |
| Ref. Mat. 3 | 90 ± 2 A | >40 g/10 min | >120° C. |
| Ref. Mat. 4 | 83 ± 2 A | >40 g/10 min | >120° C. |

Production of the Expanded Pellets by Impregnation in an Extruder

The starting materials having been obtained, they were further processed into expanded thermoplastic polyurethane pellets as follows. The dried example and reference materials were mixed in a twin-screw extruder (ZE 75, Krauss-Maffei Bernstorff) with further additives 0.1 wt % of talc as nucleating agent and optionally a TPU which, in a separate extrusion process, was admixed with 4,4'-diphenylmethane diisocyanate having an average functionality 2.05, and the mixture was melted in a temperature range of 160° C. to 220° C. Blowing agents $CO_2$ and $N_2$ were, in the extruder, injected into the melt and mixed with the thermoplastic polyurethane and the further additives to form a homogeneous melt. The exact composition of the individual inventive and comparative examples is listed in Table 3. The melt mixture was subsequently gear pumped (about 160-200° C. depending on the composition of the material) into a pelletizing die (about 180-200° C. depending on the composition of the material) and cut in the underwater pelletization (UWP) cutting chamber into pellets which were carried off by the temperature-controlled and pressurized water, expanding in the process. After the expanded pellets had been separated out of the water by means of a centrifugal dryer, the expanded pellets were dried at 60° C. for 2 h. For each inventive and comparative example, the water temperature used and the water pressure and also the resulting bulk densities of the expanded pellets are listed in Table 3. Examples 1 to 3 utilized Example Material 2, while Example 4 utilized Example Material 3. Comparative Examples 1, 2, 5 and 6 utilized Reference Material 1, Comparative Example 3 utilized Reference Material 2, Comparative Example 4 utilized Reference Material 3 and Comparative Example 7 utilized Reference Material 4. In addition, Examples 3 and 4 and also Comparative Examples 2, 3 and 4 were each admixed with 1 wt % of the TPU admixed in a separate extrusion process with 4,4'-diphenylmethane diisocyanate having an average functionality of 2.05.

TABLE 3

Data regarding inventive and comparative examples

| | Proportion of example or reference material (wt %) | Particle mass (mg) | Bulk density (kg/m$^3$) | $CO_2$ (wt %) | $N_2$ (wt %) | Water pressure in UWP (bar) | Water temperature in UWP (° C.) |
|---|---|---|---|---|---|---|---|
| Ex. 1 | 99.9 | 25 | 132 | 1.0 | 0.22 | 2.5 | 23 |
| Ex. 2 | 99.9 | 32 | 131 | 1.0 | 0.21 | 3.0 | 23 |
| Ex. 3 | 98.9 | 32 | 121 | 1.2 | 0.21 | 4.5 | 30 |
| Ex. 4 | 98.9 | 32 | 122 | 1.2 | 0.22 | 3 | 30 |
| Comp. Ex. 1 | 99.9 | 25 | 139 | 1.2 | 0.22 | 3.6 | 30 |
| Comp. Ex. 2 | 98.9 | 25 | 129 | 1.0 | 0.23 | 2.6 | 20 |
| Comp. Ex. 3 | 98.9 | 25 | 147 | 1.2 | 0.16 | 3.1 | 38 |
| Comp. Ex. 4 | 98.9 | 25 | 138 | 0.7 | 0.25 | 1.8 | 35 |
| Comp. Ex. 5 | 99.9 | 32 | 123 | 1.1 | 0.21 | 3.3 | 30 |
| Comp. Ex. 6 | 98.9 | 32 | 133 | 1.2 | 0.21 | 3 | 30 |
| Comp. Ex. 7 | 99.9 | 25 | 160 | 1.0 | 0.21 | 2.6 | 27 |

The expanded pellets were subsequently fused together on a Boost Foamer molding machine from Kurtz ersa GmbH by steaming to form square plates having an edge length of 200 mm and a thickness of 10 mm or 20 mm. The steaming conditions used were identical irrespective of plate thickness. The fusion parameters of the different materials were chosen such that the final molded part's plate side facing the moving side of the mold displayed as few collapsed ETPU beads as possible. Gap steaming was also effected where applicable via the moving side of the mold. A satisfactory surface finish was not always attainable in the comparative examples. Irrespective of the run, a cooling time of 120 s was always established at the end from the fixed and moving sides of the mold. The particular steaming conditions are listed as steam pressures in Table 4 and as corresponding steam temperatures in Table 5. It is apparent that a lower maximum steam pressure is needed to fuse together the polyurethane beads of the inventive example versus those of the comparative examples.

Figure 2:
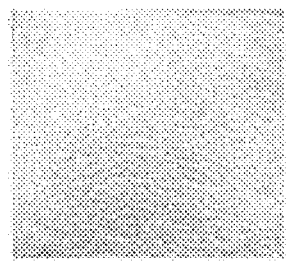
Figure 3:
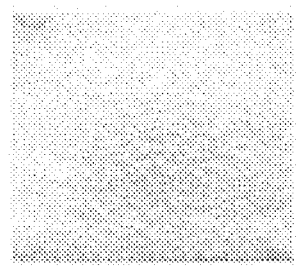
Figure 4:
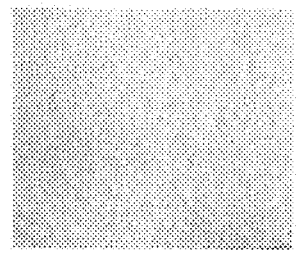
Figure 5:
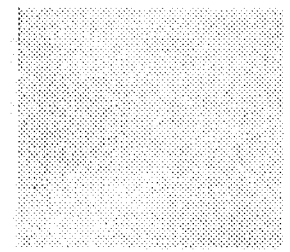
Figure 6:
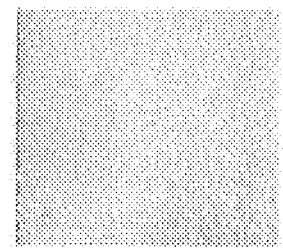

The plate surfaces facing the moving side of the mold are depicted in the Figures, where FIG. 1 shows a surface image of the plate obtained in Example 1, FIG. 2 shows a surface image of the plate obtained in Example 3, FIG. 3 shows a surface image of the plate obtained in Example 4, FIG. 4 shows a surface image of the plate obtained in Comparative Example 3, FIG. 5 shows a surface image of the plate obtained in Comparative Example 4, FIG. 6 shows a surface image of the plate obtained in Comparative Example 6.

It can be clearly seen that for comparable starting material Shore hardnesses listed in Table 2, satisfactory surfaces, where the bead structure is also still discernible, are only obtained for the plate obtained as per Comparative Example 6 as well as those obtained as per the inventive examples. The plates obtained according to Comparative Examples 3 and 4 end up with a smooth surface, pointing to a plastic deformation of the surface texture of the plate.

TABLE 4

Steam overpressures and times to fuse together the materials of the inventive and comparative examples

| | Gap steaming (bar) | Gap steaming (s) | Cross steam fixed side (bar) | Cross steam fixed side (s) | Cross steam moving side (bar) | Cross steam moving side (s) | Autoclave steam fixed/moving side (bar) | Autoclave steam (s) |
|---|---|---|---|---|---|---|---|---|
| Ex. 1 | 0.75 | 10 | 1.2 | 20 | — | — | — | — |
| Ex. 2 | 0.75 | 10 | 1.2 | 20 | — | — | — | — |
| Ex. 3 | — | — | 1.6 | 10 | 1.6 | 10 | 1.0/1.0 | 15 |
| Ex. 4 | — | — | 1.3 | 40 | — | — | 1.3/0.8 | 10 |
| Comp. Ex. 1 | 1.3 | 18 | 1.8 | 30 | — | — | — | — |
| Comp. Ex. 2 | 0.4 | 5 | 2.2 | 40 | 2.2 | 40 | — | — |
| Comp. Ex. 3 | 0.7 | 30 | 2.2 | 7 | 2.6 | 7 | 1.9/1.9 | 32 |
| Comp. Ex. 4 | — | — | 1.9 | 7 | 1.9 | 7 | 1.9/1.9 | 32 |
| Comp. Ex. 5 | — | — | 1.1 | 15 | 1.3 | 30 | — | — |
| Comp. Ex. 6 | — | — | 1.9 | 10 | 2 | 20 | — | — |
| Comp. Ex. 7 | fusion not possible at 3 bar | | | | | | | |

TABLE 5

Steam temperatures (measured at mold) and times to fuse together the materials of the inventive and comparative examples

| | Gap steaming (° C.) | Gap steaming (s) | Cross steam fixed side (° C.) | Cross steam fixed side (s) | Cross steam moving side (° C.) | Cross steam moving side (s) | Autoclave steam fixed/moving side (° C.) | Autoclave steam (s) |
|---|---|---|---|---|---|---|---|---|
| Ex. 1 | 116 | 10 | 123 | 20 | — | — | — | — |
| Ex. 2 | 116 | 10 | 123 | 20 | — | — | — | — |
| Ex. 3 | — | — | 128 | 10 | 128 | 10 | 120/120 | 15 |
| Ex. 4 | — | — | 124 | 40 | — | — | 124/116 | 10 |
| Comp. Ex. 1 | 124 | 18 | 131 | 30 | — | — | — | — |
| Comp. Ex. 2 | 109 | 5 | 135 | 40 | 135 | 40 | — | — |
| Comp. Ex. 3 | 115 | 30 | 135 | 7 | 139 | 7 | 132/132 | 32 |
| Comp. Ex. 4 | — | — | 132 | 7 | 132 | 7 | 132/132 | 32 |
| Comp. Ex. 5 | — | — | 121 | 15 | 124 | 30 | — | — |
| Comp. Ex. 6 | — | — | 132 | 10 | 133 | 20 | — | — |
| Comp. Ex. 7 | fusion not possible at 143° C. | | | | | | | |

Fusion quality of the plates can be determined via the tear strength (DIN ISO 34-1, test specimens 100×50 mm with 50 mm incision). The higher the tear strength, the better the fusion with starting materials of identical Shore hardness. The values of the inventive and comparative examples are listed in Table 6.

TABLE 6

Results on tear strength of fused plates in inventive and comparative examples (plate thickness 20 mm)

| | Plate density (kg/m$^3$) | Tear strength (N/mm) |
|---|---|---|
| Ex. 1 | 236 | 4 ± 0.11 |
| Ex. 2 | 232 | 3.58 ± 0.28 |
| Ex. 3 | 208 | 3.9 ± 0.3 |
| Ex. 4 | 226 | 2.58 ± 0.1 |
| Comp. Ex. 1 | 287 | 3.96 ± 0.17 |
| Comp. Ex. 2 | 292 | 3.45 ± 0.10 |
| Comp. Ex. 3 | 327 | 3.5 ± 0.2 |
| Comp. Ex. 4 | 299 | 0.59 ± 0.1 |
| Comp. Ex. 5 | 272 | 1.88 ± 0.59 |
| Comp. Ex. 6 | 263 | 1.57 ± 0.27 |

The samples can also be tested for tensile strength as an alternative to tear strength. Tensile strength was determined for a plate thickness of 10 mm in accordance with ASTM D5035:2015 standard designed for textiles, and the values are listed in Table 7.

TABLE 7

Results on tensile testing of fused plates in inventive and comparative examples (plate thickness 10 mm)

| | Plate density (kg/m$^3$) | Tensile strength (kPa) | Breaking extension (%) |
|---|---|---|---|
| Ex. 1 | 270 | 1460 ± 90 | 169 ± 17 |
| Ex. 2 | 235 | 911 ± 38 | 119 ± 3 |
| Ex. 3 | 240 | 820 ± 20 | 104 ± 10 |
| Ex. 4 | 230 | 850 ± 6 | 71 ± 13 |
| Comp. Ex. 1 | 301 | 812 ± 73 | 95 ± 14 |
| Comp. Ex. 2 | 305 | 919 ± 83 | 120 ± 17 |
| Comp. Ex. 3 | 310 | 819 ± 20 | 83 ± 4 |
| Comp. Ex. 4 | 314 | 730 ± 70 | 53 ± 8 |
| Comp. Ex. 5 | 281 | 450 ± 9 | 53 ± 11 |
| Comp. Ex. 6 | 291 | 710 ± 6 | 89 ± 10 |

Production of the Expanded Pellets by Impregnation in an Autoclave

For the Examples 5 and 6 as well as the Comparative Examples 8 and 9 the Example Materials 2 and 3 or rather the Reference Materials 2 and 3 were further processed as described below.

The experiments were performed with a tank fill level of 80% and a phase ratio of 0.39. The phase ratio is defined as the ratio of the mass of pellet material to the suspension medium, water in the examples.

100 parts by weight of the pellet material (corresponding to 28.0 wt %, based on the entire suspension without blowing agent), 257 parts by weight of water (corresponding to 72.0% wt %, based on the entire suspension without blowing agent), 0.13 parts by weight of a surface-active substance (Lutensol AT 25) (corresponding to 0.04 wt %, based on the entire suspension without blowing agent) and the corresponding quantity of butane as blowing agent (based on the quantity of pellets used) were heated with stirring. At a temperature of 50° C., in the liquid phase, nitrogen was then additionally injected, and the internal pressure was adjusted to a pressure of 800 kPa. On reaching the impregnation temperature, and where applicable after compliance with a retention time, and at the impregnation pressure reached at the end, depressurization was then carried out by way of a depressurization device.

Retention time is defined as the time at which the temperature of the liquid phase is in a temperature range of 5° C. below the impregnation temperature and 2° C. above the impregnation temperature.

After drying the bulk density of the resultant foam beads is measured.

The exact production parameters and the bulk density of the resultant product can be found in Table 8.

TABLE 8

Data on the examples and the comparative examples

| | Material used | Proportion of blowing agent [%] | Impregnation temperature [° C.] | Retention time [min] | Impregnation pressure [bar] | Particle mass [mg] | Bulk density [kg/m³] |
|---|---|---|---|---|---|---|---|
| Ex. 5 | Ex. Mat. 2 | 24 | 122 | 23 | 26.0 | 32 | 105 |
| Ex. 6 | Ex. Mat. 3 | 24 | 127 | 30 | 29.3 | 32 | 72 |
| Comp. Ex. 8 | Ref. Mat. 2 | 24 | 128 | 3 | 30.4 | 32 | 131 |
| Comp. Ex. 9 | Ref. Mat. 3 | 24 | 135 | 3 | 34.7 | 32 | 142 |

The expanded pellets were subsequently fused together on a Boost Foamer molding machine from Kurtz ersa GmbH by steaming to form square plates having an edge length of 200 mm and a thickness of 10 mm. The fusion parameters of the different materials were chosen such that the final molded part's plate side facing the moving side of the mold displayed as few collapsed ETPU beads as possible. Gap steaming was also effected where applicable via the moving side of the mold. A satisfactory surface finish was not always attainable in the comparative examples. The different temperatures and steaming times for the examples and comparative examples were necessary to produce comparable plates. Under identical conditions the particles of the comparative examples either were not fused together homogeneously or had collapsed on the surface. Irrespective of the run, a cooling time of 120 s was always established at the end from the fixed and moving sides of the mold. The particular steaming conditions are listed as steam pressures in Table 9 and as corresponding steam temperatures in Table 10. It is apparent that a lower maximum steam pressure is needed to fuse together the polyurethane beads of the inventive example versus those of the comparative examples.

In order to determine fusion quality the tensile strength of the samples was tested. Tensile strength was determined for a plate thickness of 10 mm in accordance with ASTM D5035:2015 standard designed for textiles, and the values are listed in Table 11.

TABLE 11

Results on tensile testing of fused plates in inventive and comparative examples (plate thickness 10 mm)

| | Plate density (kg/m³) | Tensile strength (kPa) | Breaking extension (%) |
|---|---|---|---|
| Ex. 5 | 203 | 580 ± 10 | 65 ± 7 |
| Ex. 6 | 147 | 530 ± 70 | 53 ± 9 |
| Comp. Ex. 8 | 307 | 587 ± 100 | 74 ± 15 |
| Comp. Ex. 9 | 240 | 503 ± 80 | 58 ± 13 |

TABLE 9

Steam overpressures and times to fuse together the materials of the inventive and comparative examples

| | Gap steaming (bar) | Gap steaming (s) | Cross steam fixed side (bar) | Cross steam fixed side (s) | Cross steam moving side (bar) | Cross steam moving side (s) | Autoclave steam fixed/moving side (bar) | Autoclave steam (s) |
|---|---|---|---|---|---|---|---|---|
| Ex. 5 | 1 | 20 | 1.9 | 4 | 1.9 | 7 | 1.9/1.9 | 32 |
| Ex. 6 | 1 | 20 | 2.5 | 10 | 2.5 | 13 | 2.5/2.5 | 32 |
| Comp. Ex. 8 | 1 | 20 | 2.4 | 3 | 2.4 | 3 | 2.4/2.4 | 48 |
| Comp. Ex. 9 | 1 | 20 | 3.2 | 3 | 3.2 | 3 | 3.2/3.2 | 48 |

TABLE 10

Steam temperatures (measured at mold) and times to fuse together the materials of the inventive and comparative examples

| | Gap steaming (° C.) | Gap steaming (s) | Cross steam fixed side (° C.) | Cross steam fixed side (s) | Cross steam moving side (° C.) | Cross steam moving side (s) | Autoclave steam fixed/moving side (° C.) | Autoclave steam (s) |
|---|---|---|---|---|---|---|---|---|
| Ex. 5 | 120 | 20 | 132 | 4 | 132 | 7 | 132/132 | 32 |
| Ex. 6 | 120 | 20 | 138 | 10 | 138 | 13 | 138/138 | 32 |
| Comp. Ex. 8 | 120 | 20 | 137 | 3 | 137 | 3 | 137/137 | 48 |
| Comp. Ex. 9 | 120 | 20 | 144 | 3 | 144 | 3 | 144/144 | 48 |

We claim:

1. Expanded thermoplastic polyurethane beads polymerized from an isocyanate, an isocyanate-reactive compound having a molecular weight between 500 and 10 000 g/mol and a chain extender,
wherein:
customary adjuvants may be additionally present;
the thermoplastic polyurethane has a hard phase fraction in the range from 0.15 to 0.5 and the hard phase fraction is defined by:

$$\text{Hard phase fraction} = \frac{\sum_{x=1}^{k}\left(\left(\frac{m_{KV_x}}{M_{KV_x}}\right) \cdot M_{Iso} + m_{KV_x}\right)}{m_{ges}},$$

wherein:
$M_{KV_x}$: molar mass of chain extender x in g/mol,
$m_{KV_x}$: mass of chain extender x in g,
$M_{Iso}$: molar mass of isocyanate in g/mol
$M_{ges}$: total mass of all starting materials without adjuvants
k: number of chain extenders;
wherein said chain extender is selected from the group consisting of
1,6 hexanediol,
1,6-hexanediol and 1,4-butanediol, and
1,4-butanediol and 1,3-propanediol,
excluding 1,4-butanediol alone; and
said thermoplastic polyurethane has a melting temperature below 120° C.

2. The expanded thermoplastic polyurethane according to claim 1, wherein the isocyanate is selected from the group consisting of trimethylene diisocyanate, tetramethylene diisocyanate, pentamethylene diisocyanate, hexamethylene diisocyanate, heptamethylene diisocyanate, octamethylene diisocyanate; 2-methylpentamethylene 1,5-diisocyanate, 2-ethylbutylene 1,4-diisocyanate, butylene 1,4-diisocyanate, 1-isocyanato-3,3,5-trimethyl-5-isocyanatomethylcyclohexane; 1,4-bis(isocyanatomethyl) cyclohexane; 1,4-cyclohexane diisocyanate; 1-methyl-2,4-cyclohexane diisocyanate; 1-methyl-2,6-cyclohexane diisocyanate; 2,2'-dicyclohexylmethane diisocyanate; 2,4'-dicyclohexylmethane diisocyanate; 4,4'-dicyclohexylmethane diisocyanate; 2,2'-diphenylmethane diisocyanate; 2,4'-diphenylmethane diisocyanate; 4,4'-diphenylmethane diisocyanate; 1,5-naphthylene diisocyanate; 2,4-tolylene diisocyanate; 2,6-tolylene diisocyanate; diphenylmethane diisocyanate; 3,3'-dimethylbiphenyl diisocyanate; 1,2-diphenylethane diisocyanate and phenylene diisocyanate and also any desired mixture thereof.

3. The expanded thermoplastic polyurethane according to claim 1, wherein the isocyanate-reactive compound is selected from the group consisting of a polyetherol, a polyesterol, a polybutadienol, a polycarbonateol, mixtures thereof, and block copolymers thereof.

4. The expanded thermoplastic polyurethane according to claim 1, wherein the expanded thermoplastic polyurethane is closed cell and has a cell size in the range from 1 to 250 μm.

5. The expanded thermoplastic polyurethane according to claim 1, wherein the expanded thermoplastic polyurethane is in the form of beads having a maximum longitudinal dimension of 1 to 25 mm.

6. A process for producing an expanded thermoplastic polyurethane according to claim 1, the process comprising:

(a) reacting an isocyanate with an isocyanate-reactive compound and the chain extender optionally in the presence of one or more catalysts and/or adjuvants to form a polyurethane,
wherein:
amounts of isocyanate, of isocyanate-reactive compound and of chain extender are adjusted such that the thermoplastic polyurethane has a hard phase fraction in the range from 0.15 to 0.5 and the hard phase fraction is defined by:

$$\text{Hard phase fraction} = \frac{\sum_{x=1}^{k}\left(\left(\frac{m_{KV_x}}{M_{KV_x}}\right) \cdot M_{Iso} + m_{KV_x}\right)}{m_{ges}},$$

wherein
$M_{KV_x}$: molar mass of chain extender x in g/mol,
$M_{KV_x}$: mass of chain extender x in g,
$M_{Iso}$: molar mass of isocyanate in g/mol
$M_{ges}$: total mass of all starting materials without adjuvants
k: number of chain extenders;
(b) cutting the polyurethane into pellets;
(c) impregnating the polyurethane with a blowing agent, wherein impregnating can be carried out before or after cutting the polyurethane into pellets; and
(d) depressurizing the blowing agent-impregnated polyurethane into the expanded thermoplastic polyurethane.

7. The process according to claim 6, wherein the polyurethane is impregnated with the blowing agent in an extruder, the impregnated polyurethane is cut into a pellet material, and the pellet material is depressurized into expanded thermoplastic polyurethane beads immediately after cutting.

8. The process according to claim 6, wherein the polymerizing of the polyurethane in step (a) is carried out in a first extruder or a first extruder part, impregnating of a melt is carried out in a second extruder or a second extruder part, the impregnated polyurethane is cut into a pellet material, and the pellet material is depressurized into expanded thermoplastic polyurethane beads immediately after cutting.

9. The process according to claim 6, wherein the polyurethane polymerized in step (a) is cut into a pellet material, the pellet material is impregnated with from 0.1 to 40% by weight of a blowing agent in a tank or in an autoclave at a temperature in the range from 100 to 180° C. and a pressure in the range from 5 to 100 bar, and then the blowing agent-containing pellet material is foamed by depressurization.

10. A process for producing a molded part from the expanded thermoplastic polyurethane beads according to claim 9, the process comprising:
(a) introducing the expanded thermoplastic polyurethane beads into a mold; and
(b) subjecting the expanded thermoplastic polyurethane beads introduced into the mold to steam, hot air or high-energy radiation whereby the expanded thermoplastic polyurethane beads incipiently melt at the surface and fuse together to form the molded part.

11. The process according to claim 10, wherein the molded part is a shoe sole, a gymnastics mat, a body protector, a trim element in automotive construction, a sound absorber, a vibration absorber, a cushioning pad, a bicycle saddle, a toy, a tire or a tire part or a surface for an athletic running track, a sports hall or a footpath, a damping layer or a damping core in a sandwich element or a packaging item.

12. The expanded thermoplastic polyurethane according to claim 1,
   wherein said thermoplastic polyurethane has a hard phase fraction in the range of 0.2 to 0.45.

13. The expanded thermoplastic polyurethane according to claim 1, wherein said thermoplastic polyurethane has a storage modulus at room temperature of 5 to 100 MPa.

14. The expanded thermoplastic polyurethane according to claim 1, wherein said expanded thermoplastic polyurethane beads have a density in a range from 20 to 350 g/l.

* * * * *